L. McNUTT.
METER SUPPORT.
APPLICATION FILED JAN. 20, 1920.
1,357,107.
Patented Oct. 26, 1920.
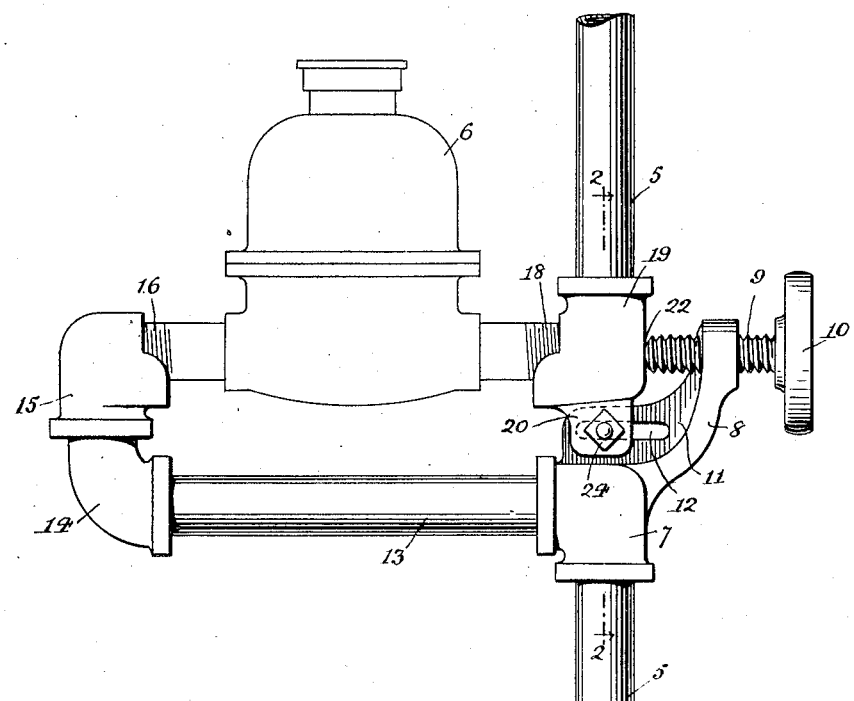
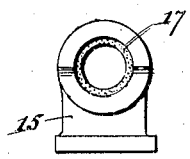
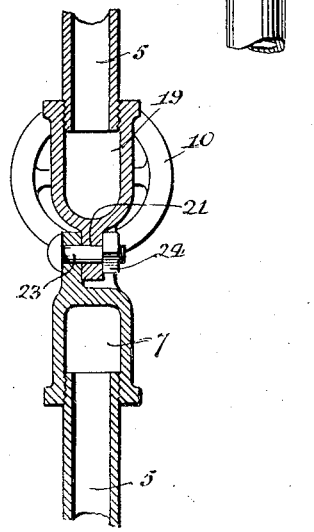
WITNESSES
H. T. Walker
P. H. Pattison
INVENTOR
L. McNutt.
BY
ATTORNEYS

UNITED STATES PATENT OFFICE.

LOUIS McNUTT, OF BRAZIL, INDIANA.

METER-SUPPORT.

1,357,107.  Specification of Letters Patent.  Patented Oct. 26, 1920.

Application filed January 20, 1920. Serial No. 352,893.

*To all whom it may concern:*

Be it known that I, LOUIS McNUTT, a citizen of the United States, and a resident of Brazil, in the county of Clay and State of Indiana, have invented a new and Improved Meter-Support, of which the following is a full, clear, and exact description.

This invention relates to new and useful improvements in pipe fittings and it pertains more particularly to connecting means for mounting a meter for ascertaining the amount of flow of material through vertical pipes.

The primary object of the invention is to provide a meter support by means of which the meter may be readily attached to or detached from the line in which it is used.

A further object of the invention is to provide a device of this character in which comparatively few parts are necessary to obtain the desired result.

With the above and other objects in view, reference is had to the accompanying drawings, in which—

Figure 1 is a view in elevation of the device showing the manner of attaching it to the line in which it is used;

Fig. 2 is a sectional view on the line 2—2 of Fig. 1;

Fig. 3 is a detail view showing the manner of forming a tight joint between the meter and its connections.

Referring more particularly to the drawings, the reference character 5 designates the main line which may be gas, water, or other fluid, the meter being designated by the reference character 6. The reference character 7 designates a coupling preferably of the elbow type, and cast or otherwise integrally formed with the coupling 7, is a bracket 8. Passing through the bracket 8 and having screw-threaded engagement therewith, is the body portion 9 of a hand-screw 10, and formed integrally with the bracket 8, is a web portion 11, which in turn is provided with an elongated slot 12, the purpose of which will be hereinafter more fully described.

Leading from the elbow coupling 7, is a pipe 13, and carried upon its opposite end is an elbow fitting 14, said elbow fitting being in turn removably secured to a fitting 15, which is adapted to receive the pipe 16 of the meter 6. The fitting 15 is provided with a gasket 17 of rubber or other suitable soft material against which the end of the pipe 16 is adapted to engage to form a tight joint between itself and the fitting 15. The reference character 18 designates a meter end opposite to the meter end 16 and the end of said pipe 18 engages a similar gasket 17 carried by the elbow fitting member 19. This fitting member 19 is similar to the fitting 15, except that it is provided with an integral depending flange 20, said flange being perforated as at 21.

In operation, after the fittings 15 and 19 have been properly positioned with respect to each other, the meter ends 16 and 18 are engaged with the gaskets 17 in their respective fittings 15 and 19. After this has been done, the hand screw 10 is tightened until its inner end engages the fitting 19, as designated by the reference character 22. As further pressure is exerted by means of the hand screw 10, the ends of the meter ends 16 and 18 are forced against their respective sockets 17, and the fittings 15 and 19, to form a tight joint between the said pipes 16 and 18, and their respective fittings 15 and 19. After the parts have been thus adjusted, a bolt 23 is passed through the opening 21 in the depending flange 20, and a nut 24 carried by said bolt is tightened to aid the hand screw 10 in maintaining the several parts in their respective positions. This bolt 23 lies in the elongated slot 12 heretofore mentioned, and said elongated slot permits of sufficient movement of the bolt to provide the necessary adjustment to obtain tight joints between the pipes 16 and 18 and their respective fittings 15 and 19.

From the foregoing, it will be apparent that the present invention provides means by which a meter or other similar instrument may be readily positioned in the main line and that its removal is equally as easily effected

Having thus described the invention, what I claim as new is:

1. A meter support comprising in combination with a main supply line, a fitting carried by said main line, a bracket arm projecting from said fitting and provided with a slotted web and an internally screw-threaded opening, a branch leading from said fitting and angularly disposed with respect to the main supply line, a meter-supporting fitting carried by one end of said branch, a meter-supporting fitting carried by the main line and having a perforated web overlying the web of the first-mentioned fitting with its perforation in a line with the slot of the first-mentioned fitting, a meter supported in the meter-supporting fittings, and means movable through the internally screw-threaded opening of the bracket arm for moving the meter fitting of the branch relatively to the meter-fitting of the main line for securing the meter in place in the meter-supporting fittings.

2. A meter-supporting device comprising in combination with an uninterrupted main line, a fitting carried by one of the sections of the main line, an integral bracket arm projecting from said fitting and provided with a screw-threaded opening, a slotted web formed integral with the bracket arm and fitting, a branch extending from said fitting and provided on one end with a meter-supporting fitting, a meter-supporting fitting carried by the other portion of the main line, a perforated web projecting from said last-mentioned meter-supporting fitting and overlying the web of the bracket arm of the first-mentioned fitting, means for adjustably moving one of said fittings relatively to the other, and means adapted for engagement with the webs of the meter-supporting fittings and the bracket arms for securing said members against movement relative to each other.

3. A meter supporting mechanism comprising a fitting, an integral bracket arm provided with an internally screw-threaded passage carried by the fitting, a slotted web connecting the arm and fitting, a plurality of meter-supporting means, one of which is movable with respect to the arm and the web, means for moving said movable meter-supporting fitting relatively to the arm, and means for maintaining said fitting against movement relative to the arm.

LOUIS McNUTT.